July 28, 1959  W. STEGEMAN  2,896,821
GLASS SLIDE DISPENSER
Filed Oct. 7, 1957
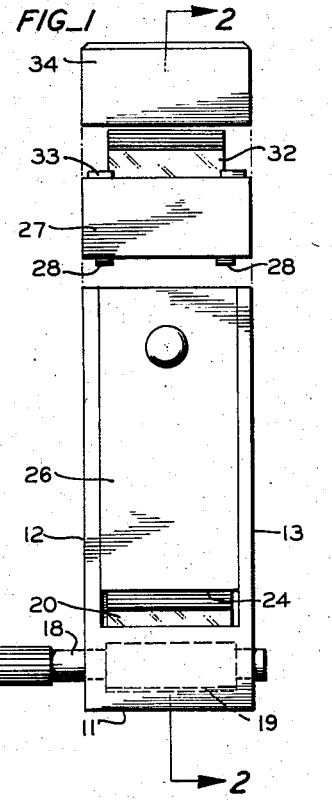
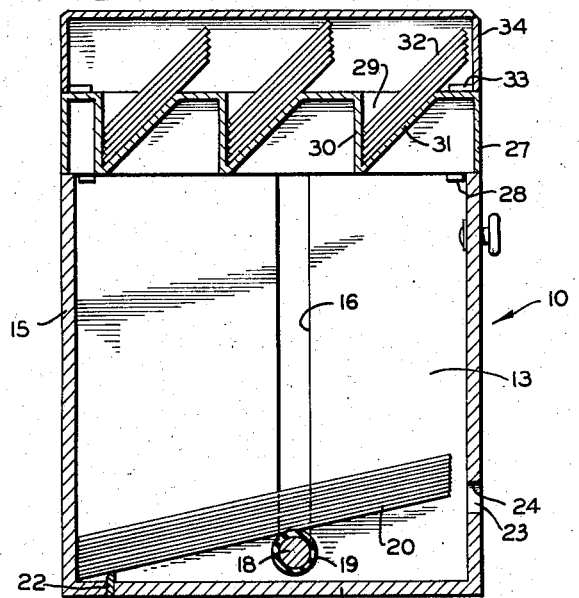
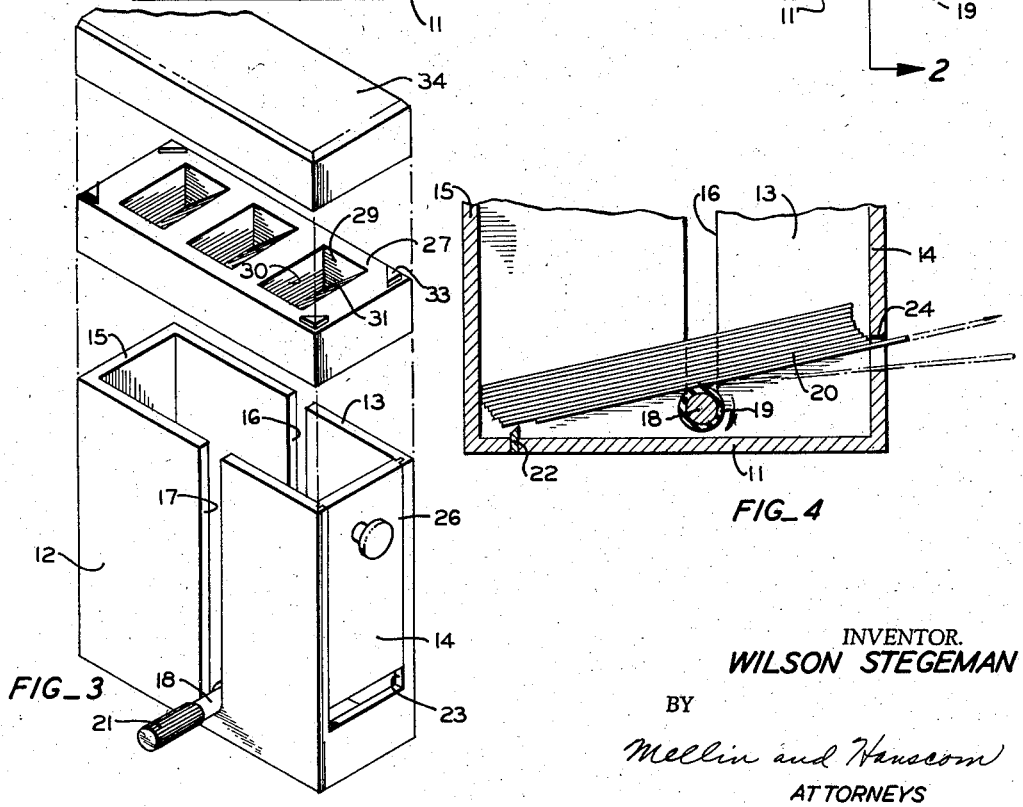
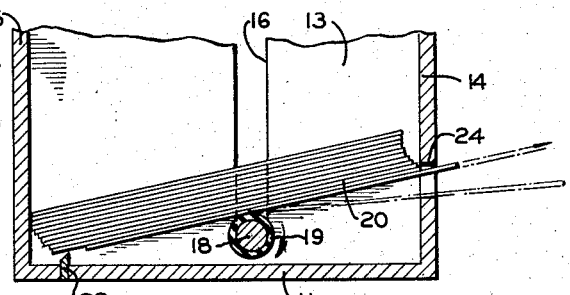
INVENTOR.
WILSON STEGEMAN
BY
Mellin and Hanscom
ATTORNEYS

United States Patent Office 2,896,821
Patented July 28, 1959

2,896,821
GLASS SLIDE DISPENSER

Wilson Stegeman, Santa Rosa, Calif.

Application October 7, 1957, Serial No. 688,687

5 Claims. (Cl. 221—259)

This invention relates to a device for dispensing glass slides, and more particularly to glass slides of the type used by physicians and clinical technicians for microscopic examinations.

An object of this invention is to provide a dispensing device for glass slides which includes a box-shaped magazine adapted to receive a stack of slides in an inclined position, a frictional roller adapted to engageably support the lowermost slide of the stack and a discharge slot in alignment with the lowermost slide in the magazine, the discharge slot being proportioned to allow only the lowermost slide to be ejected, whereby when the roller is manually rotated, the lowermost slide in the stack will be dispensed from the magazine.

A further object of the invention is to provide a slide dispenser as set forth in the last object and further including a tray member adapted to cover the magazine and provide a holder for glass cover slips to be used with the glass slides and from which the cover slips may be easily removed one at a time.

Other objects and advantages will become apparent in the course of the following detailed description.

In the drawings, forming a portion of this application and in which like reference numerals are applied to like parts throughout the same, Fig. 1 is a front elevational view of a dispenser constructed in accordance with this invention.

Fig. 2 is a sectional view taken on line 2—2 of Fig. 1.

Fig. 3 is a perspective view of the dispenser with the tray member and cover separated from one another.

Fig. 4 is a partial view, similar to Fig. 2, illustrating the device in operation.

Referring now to the drawings, wherein for purposes of illustration is shown a preferred embodiment of the invention, the dispenser comprises a box-shaped magazine, indicated generally by the reference numeral 10, having a bottom wall 11, opposed side walls 12 and 13, a front wall 14 and a rear wall 15.

A slot 16 is formed in side wall 13 extending downwardly from the top edge thereof to adjacent the bottom wall, with a similar slot 17 being formed in side wall 12, the slots 13 and 17 being adapted to receive a shaft member 18 therein extending perpendicularly through the side walls. Snugly surrounding the shaft, within the magazine, is a sleeve member 19, preferably made of rubber or the like, which serves a double function of providing a frictional surface to engage the glass slides 20 and also to prevent the shaft from being pulled out accidentally through slot 16 or 17. The portion of shaft 18 projecting exteriorly of the magazine is roughened, as by knurling or milling, at 21, to enable the shaft to be easily gripped for manual rotation.

The slots 16 and 17 and the shaft mounted therein are spaced more closely to the front wall 14 than to the rear wall 15 so that when a stack of glass slides 20 are inserted into the magazine, the slides will inherently be inclined with the lowermost slide being supported by the shaft 18 and by the bottom wall adjacent to the rear wall, as shown in Figs. 2 and 4. A support rail 22 is preferably formed on the bottom wall 11 adjacent the rear edge thereof so as to support the lowermost slide above the rest of the bottom wall. One purpose of this rail is to provide a dust space below the lowermost slide so as to keep the slides from picking up such dust as might collect in the bottom of the magazine.

A discharge slot 23 is formed in the front wall 14, in alignment with the lowermost slide 20, as supported on shaft 18 and rail 22. Thus, as shaft 18 is manually rotated, the frictional engagement of the sleeve 19 with the lowermost slide will cause the slide to be projected out through the slot 23. The rail 22 will insure that the slide moves through a straight line until it enters the discharge slot 23. The upper edge 24 of slot 23 is at a distance above the bottom wall 11 so that the lowermost slide will be able to pass through the slot but the next highest slide will be engaged by the upper slot edge and will thus be prevented from passing through the slot until the lowermost slide has been removed from the dispenser.

When the rear edge of the slide being dispensed passes the roller 18, the slide will pivot around the rear end thereof to rest on the lower edge of slot 23, as shown in the dotted line position of Fig. 4. Since the shaft 18 is off center, the major part of slide 20 will be outside the magazine so that only the rear end of the slide will rest against the lower surface of the now lowermost slide in the stack. The dispensed slide may now be grasped by the side edges thereof and removed.

The portion 26 of the front wall above the slot 14 has a sliding fit with the side walls of the magazine so that the portion 26 may be removed upwardly from the magazine to allow for the easy insertion of a new stack of slides therein.

A tray member 27, having outside dimensions corresponding to the outside dimensions of magazine 10, has a depending lug 28 in each corner thereof adapted to fit within the corners of the magazine so that the tray member may removably cover the magazine. A plurality of pockets 29 are formed in the tray member, each pocket having a downwardly extending vertically disposed wall 30 and a wall 31 inclined upwardly from the bottom edge of the wall 30. These pockets are used to contain the glass cover slips 32 used with the slides 20. As shown in Fig. 2, the cover slips are upwardly inclined with the bottom edges all resting against the wall 30, so that the upper edge of the uppermost cover slip will be free from the next lower cover slip to enable the uppermost cover slip to be easily removed from the next lower cover slip.

The upper surface of tray member 27 is provided with a plurality of upwardly extending lugs 33 adapted to fit within the corners of an inverted box-shaped cover 34 so that the cover may be removably fitted onto the tray member.

The slots 16 and 17 in side walls 12 and 13 enable the shaft 18 to be easily removed from the slots and reversed if it is desired to operate the dispensing device by the left hand rather than the right hand.

The present device has an important advantage that the stack of slides, when placed within the magazine, will assume an inclined position which causes less friction between the slide being dispensed and the next adjacent slide. Furthermore, the dispensed slide will be held by the device until it is manually removed, but the dispensed slide will be free from the remaining slides, and thus need not be drawn across the remaining slides when finally removed.

It is to be understood that the form of the invention, herewith shown and described, is to be taken as a preferred embodiment of the same, and that various changes in the shape, size and arrangement of parts may be resorted to without departing from the spirit of the invention or the scope of the attached claims.

Having thus described my invention, what I claim and desire to secure by Letters Patent is:

1. A glass slide dispenser comprising a box-shaped magazine having a bottom wall, opposed side walls, a front wall and a rear wall, a rotatable shaft projecting perpendicularly through said side walls adjacent the bottom wall and being closer to the front wall than to the rear wall, said shaft having a frictional surface thereon between said side walls and a manually rotatable portion extending exteriorly of said magazine, said frictional surface having an upper portion lying substantially above the rear portion of said bottom wall, said magazine being thus adapted to receive a stack of glass slides therein with the slides being supported on the upper portion of the frictional surface of said shaft and the rear of said bottom wall, and a discharge slot wider than the thickness of one of said slides formed in the front wall in alignment with the inclined lowermost of the slides supported on said frictional surface, said slot having its upper edge spaced from the bottom wall at a height to allow the lowermost of said slides to pass through the discharge slot upon a rotation of said shaft while intercepting the next adjacent slide to prevent discharge thereof.

2. A glass slide dispenser comprising a box-shaped magazine having a bottom wall, opposed side walls, a front wall and a rear wall, a rotatable shaft projecting perpendicularly through said side walls adjacent the bottom wall and being closer to the front wall than to the rear wall, said shaft having a frictional surface thereon between said side walls and a manually rotatable portion extending exteriorly of said magazine, said frictional surface having an upper portion lying substantially above the rear portion of said bottom wall, said magazine being thus adapted to receive a stack of glass slides therein with the slides being supported on the upper portion of the frictional surface of said shaft and the rear of said bottom wall, a discharge slot wider than the thickness of one of said slides formed in the front wall in alignment with the inclined lowermost of the slides supported on said frictional surface, said slot having its upper edge spaced from the bottom wall at a height to allow the lowermost of said slides to pass through the discharge slot upon a rotation of said shaft while intercepting the next adjacent slide to prevent discharge thereof, and said opposed side walls having slots therethrough extending downwardly from the top edges thereof to adjacent the bottom wall, said shaft being removably supported in said side wall slots.

3. A glass slide dispenser comprising a box-shaped magazine having a bottom wall, opposed side walls, a front wall and a rear wall, a rotatable shaft projecting perpendicularly through said side walls adjacent the bottom wall and being closer to the front wall than to the rear wall, said shaft having a frictional surface thereon between said side walls and a manually rotatable portion extending exteriorly of said magazine, said frictional surface having an upper portion lying substantially above the rear portion of said bottom wall, said magazine being thus adapted to receive a stack of glass slides therein with the slides being supported on the upper portion of the frictional surface of said shaft and the rear of said bottom wall, a discharge slot wider than the thickness of one of said slides formed in the front wall in alignment with the inclined lowermost of the slides supported on said frictional surface, said slot having its upper edge spaced from the bottom wall at a height to allow the lowermost of said slides to pass through the discharge slot upon a rotation of said shaft while intercepting the next adjacent slide to prevent discharge thereof, and a slide supporting rail formed in the bottom wall adjacent the rear wall to support the rear end of said slides.

4. A glass slide dispenser comprising a box-shaped magazine having a bottom wall, opposed side walls, a front wall and a rear wall, a rotatable shaft projecting perpendicularly through said side walls adjacent the bottom wall and being closer to the front wall than to the rear wall, said shaft having a frictional surface thereon between said side walls and a manually rotatable portion extending exteriorly of said magazine, said frictional surface having an upper portion lying substantially above the rear portion of said bottom wall, said magazine being thus adapted to receive a stack of glass slides therein with the slides being supported on the upper portion of the frictional surface of said shaft and the rear of said bottom wall, and a discharge slot wider than the thickness of one of said slides formed in the front wall in alignment with the inclined lowermost of the slides supported on said frictional surface, said slot having its upper edge spaced from the bottom wall at a height to allow the lowermost of said slides to pass through the discharge slot upon a rotation of said shaft while intercepting the next adjacent slide to prevent discharge thereof, the portion of said front wall above said discharge slot being slidably removable from said magazine to permit the insertion of said slides into the magazine.

5. A glass slide dispenser comprising a box-shaped magazine having a bottom wall, opposed side walls, a front wall and a rear wall, a rotatable shaft projecting perpendicularly through said side walls adjacent the bottom wall and being closer to the front wall than to the rear wall, said shaft having a frictional surface thereon between said side walls and a manually rotatable portion extending exteriorly of said magazine, said frictional surface having an upper portion lying subtsantially above the rear portion of said bottom wall, said magazine being thus adapted to receive a stack of glass slides therein with the slides being supported on the upper portion of the frictional surface of said shaft and the rear of said bottom wall, a discharge slot wider than the thickness of one of said slides formed in the front wall in alignment with the inclined lowermost of the slides supported on said frictional surface, said slot having its upper edge spaced from the bottom wall at a height to allow the lowermost of said slides to pass through the discharge slot upon a rotation of said shaft while intercepting the next adjacent slide to prevent discharge thereof, and a slide supporting rail formed in the bottom wall adjacent the rear wall, the portion of said front wall above said discharge slot being slidably removable from said magazine to permit the insertion of said slides into the magazine.

References Cited in the file of this patent

UNITED STATES PATENTS

| 530,926 | Cole | Dec. 18, 1894 |
| 546,154 | Hoyt | Sept. 10, 1895 |
| 663,726 | Carlen | Dec. 11, 1900 |
| 667,182 | Billingslea | Feb. 5, 1901 |
| 1,059,963 | Huhn | Apr. 22, 1913 |
| 1,566,175 | Vaghi | Dec. 15, 1925 |
| 1,649,435 | Woods et al. | Nov. 15, 1927 |
| 2,594,634 | Galloway | Apr. 29, 1952 |

FOREIGN PATENTS

| 15,278 | Great Britain | of 1911 |
| 776,605 | Great Britain | June 12, 1957 |
| 813,637 | France | Mar. 1, 1937 |